US008904653B1

(12) United States Patent
Miaskiewicz (10) Patent No.: US 8,904,653 B1
(45) Date of Patent: Dec. 9, 2014

(54) PORTABLE WHEEL ALIGNMENT DEVICE AND SYSTEM

(76) Inventor: Richard Miaskiewicz, San Diego, CA (US)

( * ) Notice: Subject to any disclaimer, the term of this patent is extended or adjusted under 35 U.S.C. 154(b) by 132 days.

(21) Appl. No.: 13/447,157

(22) Filed: Apr. 13, 2012

Related U.S. Application Data (60) Provisional application No. 61/474,905, filed on Apr. 13, 2011.

(51) Int. Cl.
*G01B 5/255* (2006.01)
(52) U.S. Cl.
USPC ........................................................ 33/203.18
(58) Field of Classification Search
USPC ........................................................ 33/203.18
See application file for complete search history.

(56) References Cited

U.S. PATENT DOCUMENTS

| | | | | |
|---|---|---|---|---|
| 3,488,857 A | * | 1/1970 | Bateman | 33/203.18 |
| 4,651,431 A | * | 3/1987 | Mieling | 33/203.18 |
| 5,033,198 A | * | 7/1991 | Hastings | 33/203.18 |
| 5,054,207 A | * | 10/1991 | Marshall | 33/600 |
| 5,168,632 A | * | 12/1992 | Rimlinger, Jr. | 33/288 |
| 5,471,754 A | * | 12/1995 | Mieling | 33/203.18 |
| 5,619,800 A | * | 4/1997 | Unruh | 33/203.15 |
| 5,815,257 A | * | 9/1998 | Haas | 356/155 |
| 5,842,281 A | * | 12/1998 | Mieling | 33/203.18 |
| 7,152,333 B1 | * | 12/2006 | Chou | 33/203.18 |
| 7,174,776 B2 | * | 2/2007 | Temkin et al. | 73/117.03 |
| 7,461,556 B2 | * | 12/2008 | Hamilton | 73/669 |
| 2007/0112469 A1 | * | 5/2007 | Hara | 700/279 |

OTHER PUBLICATIONS

Intercompracing, Inc., Precision Hub Plate Scale System, 2011 Intercomp Racing Catalog, 2011, 2 pages, www.intercompracing.com by Artropolis Inc., USA.
Intercompracing, Inc., 2011 Intercomp Racing Catalog, 2011, pp. 1-32, www.intercompracing.com by Artropolis Inc., USA.

* cited by examiner

*Primary Examiner* — Christopher Fulton
(74) *Attorney, Agent, or Firm* — San Diego IP Law Group LLP (57) ABSTRACT

The present invention provides, in at least one embodiment, a portable wheel alignment and weighing system and device having a hub adaptor that attaches to the bolts of a wheel hub assembly after the wheel is removed, having a plurality of novel independent rolling wheels allowing the suspension to settle before measuring parameters, having a plurality of optical sensors for measuring the alignment parameter before, during, and after the adjustment. The wheel alignment device eliminates the need for a slip plate through the plurality of independent rolling wheels, eliminates the need for a big and costly alignment rack due to its portable nature, improves alignment accuracy due to measurements being performed on the suspension directly without the tires on, and allows for faster alignments due to live adjustments, since the mechanic is allowed full access to the adjustment location.

27 Claims, 6 Drawing Sheets

PORTABLE WHEEL ALIGNMENT DEVICE AND SYSTEM

CROSS REFERENCE TO RELATED APPLICATIONS

This application claims priority under 35 U.S.C. §119(e) to U.S. Provisional Application No. 61/474,905, filed Apr. 13, 2011, and entitled "Portable Wheel Alignment Device and System," the disclosure of which is hereby incorporated by reference in its entirety.

BACKGROUND OF THE INVENTION

1. Field of Invention

The present invention relates generally to automobile wheel alignments, and more specifically, to an improved, portable wheel alignment device and system.

2. Description of Related Art

A wheel alignment, also known simply as an alignment, is a measurement and adjustment of angles of a vehicle's wheel suspension to a desired and/or optimal performance configuration. Generally, a wheel alignment includes adjusting the angles of the wheels so that they are set within the car maker's specifications. Alignment angles can also be altered beyond the maker's specifications for sport and off road performance. Correct adjustment of the suspension angles is critical to balance the tire tread wear and to ensure that the vehicle travels straight. Regular wheel alignments are considered to be routine preventative maintenance.

Out-of-alignment conditions occur when the suspension and steering systems are not operating at their desired angles. The primary angles are the basic angle alignment of the wheels relative to each other and to the car body. These angles include the camber angle (i.e., vertical angle of wheel when viewed from front or rear), the caster angle (i.e., angle between the pivot line and vertical), and toe (i.e., symmetric angle that each wheel makes with the longitudinal axis of the vehicle). Secondary angles include numerous other adjustments, such as without limitation, steering axis inclination (SAI), included angle, bump steer, maximum turns, toe curve change, track width difference, wheel base difference, front ride height, rear ride height, and frame angle.

Out-of-alignment conditions are most often caused by spring sag or suspension wear on an older vehicle, but can also be caused from impact with a pothole, curb, rocks, or a change in vehicle ride height. This will usually result in more rapid tire wear and decreased fuel economy. The alignment should be checked whenever new tires or suspension components are installed, any time unusual tire wear patterns appear, after the vehicle has encountered a major road hazard, pothole, or curb, among other occasions (e.g., when the vehicle drifts, pulls, or otherwise handles unusually, when the vehicle vibrates, when the steering wheel is not centered, during periodic safety checks, for custom performance, and when there are worn components such as ball joints, arms, struts, shocks, or springs).

The optimum alignment of the vehicle depends on the driver's driving style. For a commuter driver, aligning the vehicle to the vehicle manufacturer's preferred settings is appropriate. Although there are acceptable angle ranges provided in the manufacturer's recommendations, the wheel alignment should align the vehicle to the preferred settings, and not just simply within the range. For an assertive or competitive driver, someone who enjoys driving hard through the corners, a performance alignment is appropriate. The performance alignment maximizes the performance of the tire. The performance alignment uses a maximum negative camber, maximum positive caster, and aggressive toe settings.

Three common types of wheel alignments offered are: a front-end wheel alignment, a thrust angle wheel alignment, and a four-wheel alignment. The front end wheel alignment only measures and adjusts the front axle's angles, and is sufficient for vehicles with a solid rear axle and where the front tires are positioned directly in front of the rear tires. The thrust angle wheel alignment is for the solid rear axle, which requires a technician to confirm that all four wheels are square with each other, to prevent the vehicle from going down the road with the rear end offset from the front end, otherwise known as a dog tracking. Four wheel alignments are needed for vehicles with four-wheel independent suspensions, or front-wheel drive vehicles with adjustable rear suspensions. This procedure squares the vehicle like a thrust angle alignment, and also includes measuring and adjusting the rear axle angles as well as the front.

An optical sensor unit (also known as a head, optical sensor, laser sensor, etc.) is often attached to a clamp which holds on to a wheel. There is usually one optical sensor per wheel in a wheel alignment system, meaning four optical sensor units for a car having four wheels. These optical sensor units communicate their physical positioning with respect to other optical sensor units to a central computer which calculates and displays how much the camber, toe and caster are misaligned. Conventional measurements are typically performed with the vehicle's wheel (i.e., tire) not removed from the vehicle.

When aligning a vehicle, it is appropriate for the vehicle to be carrying its typical load. This is important for drivers who continuously carry loads in their vehicles. Additionally, when a vehicle is used for autocross or track events, some racers will sit in their car, or have the alignment shop ballast their vehicle to include the influence of the driver's weight on the suspension angles.

Corner weighting (also known as corner balancing, weight jacking, and scaling) involves adjusting the spring perches of a car to get a balanced diagonal weight on the tires. Ideally, the car should have 50% of its weight on the left front and right rear tires and 50% on the right front and left rear tires. In other words, the suspension of the car has to be adjusted so that each corner of the car applies the same amount of force on the ground, relative to the diagonally-opposite corner of the car, so that the car does not rock back and forth. To measure corner weight, scales can be placed underneath each tire to measure the weight of each corner. An ideal corner balance would have the sum of the weights of the right-front and left-rear corners equal to the sum of the weights of the left-front and right-rear corners. If the car's corner weights are not equal, then the car's the tires may wear unevenly and the handling may be unbalanced, in that the car will turn better in one direction than in the other direction.

Conventional alignments are typically performed using an alignment rack. The vehicle is driven onto the alignment rack, which allows access to the underside of a vehicle while the chassis rests its full weight on all four wheels on a level surface in order to carry out alignment measurements and adjustments. The primary static suspension angles that need to be measured and adjusted are camber, caster, toe, and thrust angle. The alignment rack has movable slip plates that go under the vehicle's wheels that relieves the pressure off the suspension and allows the suspension to settle prior to the alignment.

Alignment racks are large, often approximately 20 feet long and 8 feet wide, which takes up valuable space such as a whole bay in a mechanic's shop, which prevents many small mechanical shops from doing alignments all together. In addition, these alignment racks are stationary and do not lend themselves to being portable and performing alignments outside of the garage. Further, alignment racks are expensive, often costing $50,000 to $100,000, which further prevents small mechanic shops from doing alignments. Moreover, alignments using alignment racks take approximately an hour, which makes them time consuming. Conventional alignment devices lack many useful features that prevent many mechanic shops from even doing alignments. Further, conventional alignment tools do not relieve the pressure off the suspension or allow the vehicle's suspension to settle prior to an alignment producing less accurate alignments.

SUMMARY OF THE INVENTION

The present invention provides, in at least one embodiment, a portable wheel alignment and vehicle weighing system and device having a hub adaptor that attaches to the bolts of a wheel hub assembly after the wheel is removed, having a plurality of independent rolling wheels allowing the suspension to settle before measuring the alignment parameters, and having a plurality of optical/laser sensors and receivers for measuring the alignment parameter before, during, and after the adjustment.

Embodiments of the present invention have several advantages over conventional alignments. For example, the portable wheel alignment device saves space. Typical alignment racks are large and generally require a dedicated alignment work area, which prevents many small auto mechanic shops and mobile mechanics (e.g., a mechanic associated with the American Automobile Association) from performing alignments. Further, the wheel alignment device saves money, as alignment racks can cost between $50,000 and $100,000, which is beyond the savings and credit limits of many auto mechanics, which prevents many auto mechanics from doing alignments.

Also advantageously, wheel-less alignment devices with wheels/bearings rolling the resting surface in embodiments of the present invention are more accurate. By removing the wheel and attaching the alignment device directly and securely to the hubs of a vehicle, the alignment device may accurately measure the suspension angles without the lateral tractive chassis binding forces caused by a static in-place tire and wheel. Wheels may be bent without any sign of damage, such that the wheels contribute error to the alignment. Also, wheels vary widely in shape and size and are not perfectly round or square. Further, the wheel alignment device saves time, as the mechanic can see the change as it is made (i.e., live adjustment), unlike typical alignment machines and racks which can require redundant measuring procedure. Live adjustment is possible since the alignment device is compact such that the mechanic is allowed full access to the adjustment location. As such, the entire process can be performed much faster.

The foregoing, and other features and advantages of the invention will be apparent from the following, more particular description of the preferred embodiments of the invention, the accompanying drawings, and the claims.

BRIEF DESCRIPTION OF THE DRAWINGS

For a more complete understanding of the present invention, and the advantages thereof, reference is now made to the ensuing descriptions taken in connection with the accompanying drawings briefly described as follows.

DETAILED DESCRIPTION OF EMBODIMENTS

Further features and advantages of the invention, as well as the structure and operation of various embodiments of the invention, are described in detail below with reference to the accompanying FIGS. 1-6, wherein like reference numerals refer to like elements. Although embodiments of the invention are described in the context of cars in a mechanic's shop, one of ordinary skill in the art readily appreciates that the present invention is applicable to other types of vehicles in other types of environments, such as, but not limited to trucks broken down on the side of a freeway or race cars at a racetrack.

The present invention provides, in at least one embodiment, a portable wheel alignment and weighing system and device having a hub adaptor that attaches to the bolts of a wheel hub assembly after the wheel is removed, having a plurality of novel independent rolling wheels allowing the suspension to settle before measuring the alignment parameters, and having a plurality of optical/laser sensors and receivers for measuring the alignment parameter before, during, and after the adjustment. The wheel alignment device eliminates the need for a slip plate through the plurality of independent rolling wheels, eliminates the need for an alignment rack due to its portable nature, improves alignment accuracy due to measurements being performed on the suspension directly without the tires on, and allows for faster alignments due to live adjustments, since the mechanic is allowed full access to the adjustment locations without having to remove a wheel or change its position in order to make an adjustment.

Figure 1:
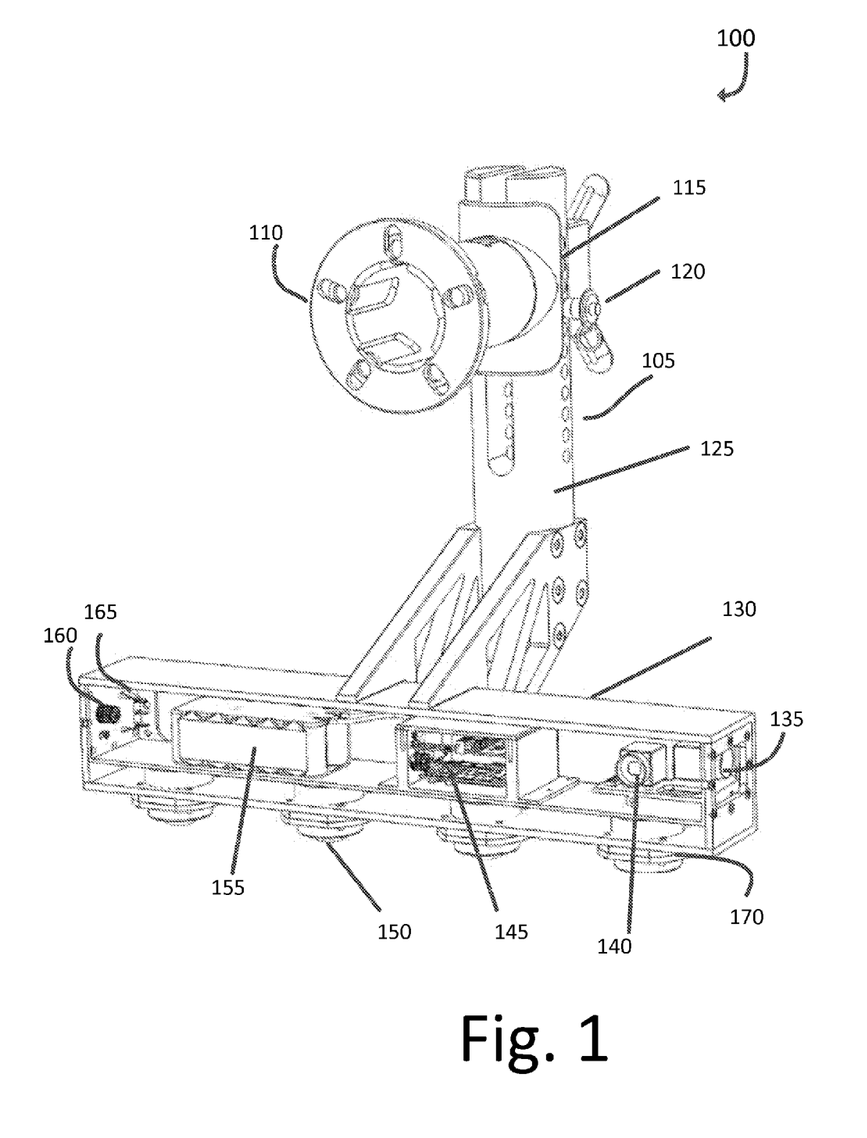
FIG. 1 illustrates a wheel alignment device according to an embodiment of the invention.

FIG. 1 illustrates a wheel alignment device 100 according to an embodiment of the invention. The wheel alignment device 100 includes a jig 105. The jig 105 comprises a hub adapter 110, height slots 115, and a height adjustment plug 120, and a height clamp assembly 125. The jig 105 comprises an electronics cartridge 130, a first optical sensor 135, a second optical sensor 140, a circuit board 145, wheels 150, a battery 155, an electronic input 160, a power switch 165, and weight detecting load cells 170. The wheel alignment device 100 (e.g., portable device, jig-a-line, precision hub plate system, etc.) is portable, storable, and eliminates the need for using an alignment rack. The portable nature of the wheel alignment device 100 enables more mechanics to perform alignments (e.g., mobile mechanical, fleet garages, etc.).

The jig 105 attaches to bolts (e.g., lugs) and wheel hub assembly of a vehicle through the hub adapter 110 (e.g., quick change universal hub adapter) after the vehicle is lifted (e.g., through a floor jack, cradle lift, two post lift, etc.) and the wheel is removed. By removing the wheel, the wheel alignment device measures the suspension directly and produces a more accurate measurement than if the wheel is not removed.

The jig 105 can include notches, where the notches provide a visual indicator of the jig measure height.

The hub adaptor 110 is shown with five openings configured to attach to a wheel assembly with five bolts. However, the hub adapter 110 can be replaced with a hub adaptor having a different amount of openings and configuration (e.g., one, three, four, six, eight, etc.), making the wheel alignment device 100 configurable to nearly all vehicles. Further, the hub adapter 110 can be a universal hub adapter. The universal hub adaptor can be configured to be attached to many types of wheel hubs, and ideally all wheel hubs. The hub adapter 110 can work with metric and standard (e.g., American) measurement systems The height adjustment plug 120 (e.g., repositionable fasteners) allows for rapid adjustments to the vertical height of the height clamp assembly 125 in the case of a 2-wheel alignment where the height of the hub adapter 110 must match that of the radius of the removed tire, with the height adjustment plug 120 holding the height clamp assembly 125 and hub adapter 110 in place.

The jig 105, chassis, and electronics in the electronics cartridge 130 for measuring the alignment parameters. The jig 105 can be made from any material (e.g., CNC machined or cast aluminum). The first optical sensor 135 and second optical sensor 140 (e.g., optical/laser sensors) work together to measure the alignment.

The optical sensors 135, 140 can be high definition video imaging and using target LEDs for measuring, or any type of electromagnetic or laser sensor, the implementation of which is apparent to one of ordinary skill in the art. In an alternative embodiment, a tape measure, a level (e.g., bubble level, digital level, etc.), or a digital measuring means is used instead of the optical sensors 135, 140 to measure vehicle alignment parameters. Vehicle alignment parameters include, among others, toe, camber, caster, etc.

The circuit board 145 has electronics for wired and wireless communication (e.g., 2.4 GHz wireless signal, Bluetooth, etc.) with a device such as a handheld data center, smartphone, or computer, for comparing the measured alignment parameters to acceptable alignment parameters. The circuit board 145 can be part of a wireless communication package.

The wheels 150 (e.g., ground bearings, free motion rollers, industrial ball transfer units, etc.) can have a plurality of wheels, each of the wheels being designed to roll independently of each other, roll in all directions (i.e., free to move in all 360 degrees). The novel wheels 150 are an improvement over conventional alignment tools because they relieve the pressure off the suspension allowing the vehicle's suspension to settle prior to an alignment. The wheels can be of any form. For example, the wheels can be spherical bearings (more commonly known as a ball transfer unit), caster wheels, or rotary bearings. The wheels 150 touch the ground and contribute to the portable nature of the wheel alignment device 100. The wheels 150 can have weight detecting load cells 170 above them.

The weight detecting load cells 170 (e.g., optional electric load cells, load cells, etc.) can measure vehicle's total weight and corner weight (also known as corner balancing, weight jacking, and scaling). The load cells 170 can be a transducer that helps determine the weight.

The battery 155 provides power to components in the electronics cartridge 130, such as the first optical sensor 135, the second optical sensor 140, and the circuit board 145. The battery 155 can have an extended battery life and be rechargeable. The electronic input 160 allows for wired communication between the circuit board 145 and a processor located off of the wheel alignment device 100. The input 160 can receive an electronic communications plug.

The power switch 165 powers the wheel alignment device 100 on and off and can preserve the life of the battery 155. Alternatively, the battery can be replaced or supplemented by an external power supply.

Figure 2:
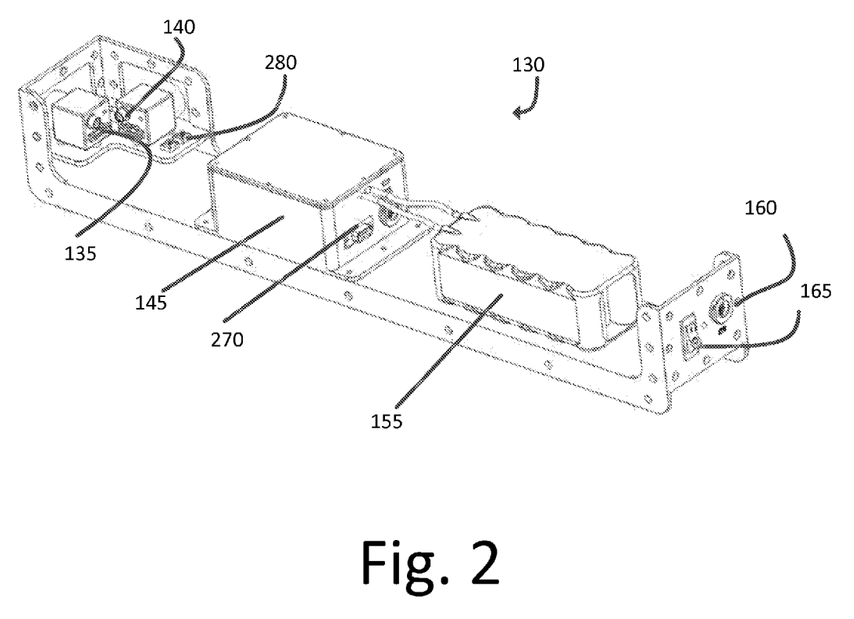
FIG. 2 illustrates an electronics cartridge of a wheel alignment device according to an embodiment of the invention.

FIG. 2 illustrates the electronics cartridge 130 of the wheel alignment device 100 according to an embodiment of the invention. The electronics cartridge 130 in FIG. 2 shows the first optical sensor 135, the second optical sensor 140, the circuit board 145, the battery 155, the electronic input 160, the power switch 165, connectors 270, and a multi-axis inclinometer 280. The connectors 270 connect the circuit board 145 to at least the battery 155 and the electronic input 160.

If the car is aligned on an uneven surface, such as on an incline or on a worn and uneven surface, by comparing data from the multi-axis inclinometer 280 to data collected by optical sensors 135, 140 and processing this data via circuit board 145 or computer 485, the alignment device 100 may have wheel 150 resting surface mapping and alignment value compensation. This new use of the multi-axis inclinometer 280 in conjunction with optical sensors 135, 140 and circuit board 145 allows for a novel surface compensation method. Surface compensation is a very useful alignment feature.

The connectors 270 can also connect to the electric load cells 170 for communicating the measured corner weight from the circuit board 145 to a processor located off of the wheel alignment device 100. The electronics cartridge 130 may be of modular design.

Figure 3:
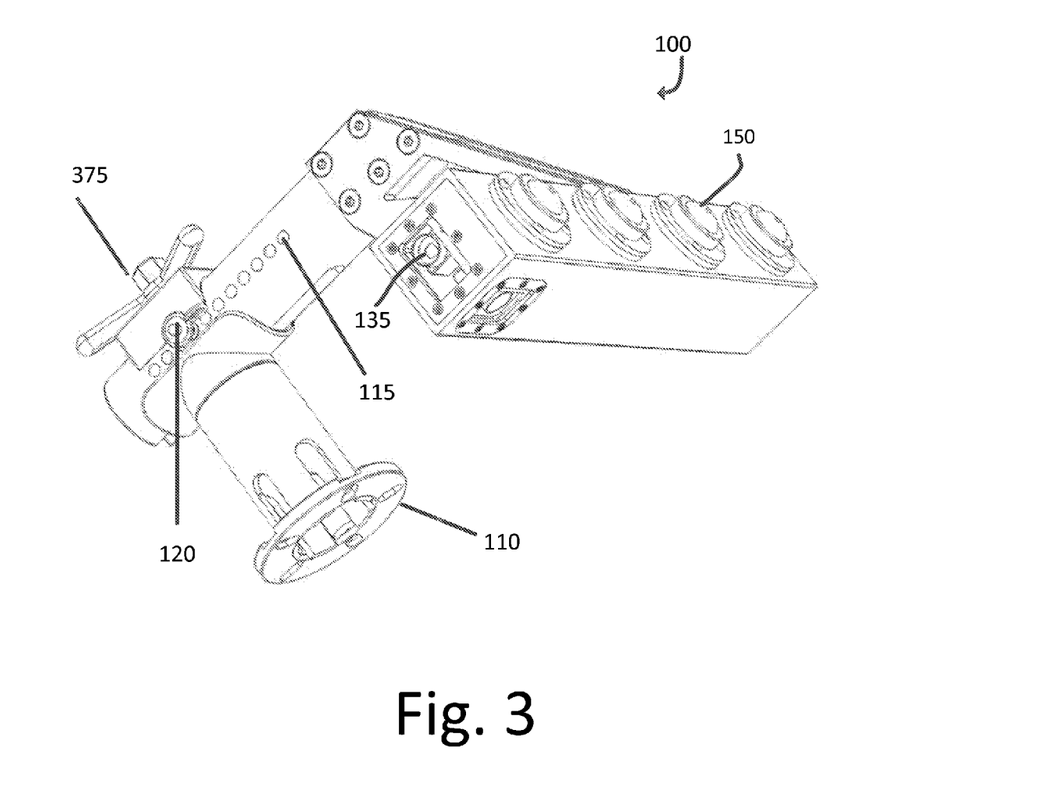
FIG. 3 illustrates a bottom perspective view of a wheel alignment device according to an embodiment of the invention.

FIG. 3 illustrates a bottom perspective view of the wheel alignment device 100 according to an embodiment of the invention. The wheel alignment device 100 in FIG. 3 shows the hub adapter 110, the height slots 115, the height adjustment plug 120, the first optical sensor 135, the wheels 150, and a wingnut 375. The wingnut 375 releases the hub adapter 110 such that a hub adaptor with a different number of lug openings can be used. The wingnut 375 includes a nut with a pair of wings which enables it to be turned without tools. The wingnut includes a hex nut and a square socket. The wingnut 375 also includes a hex shaped feature allowing it to be turned with a wrench. Also, the wingnut 375 also includes a square shaped hole to allow for a socket wrench to be used without a socket in place.

Figure 4:
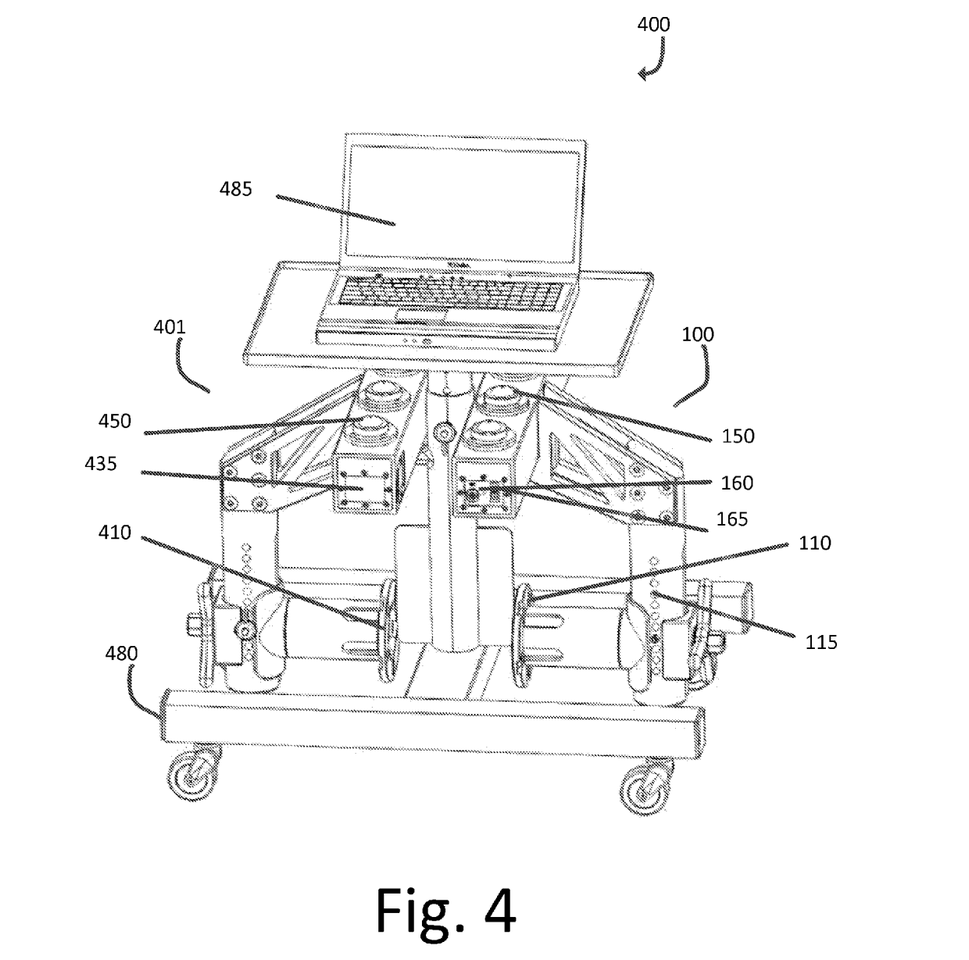
FIG. 4 illustrates a wheel alignment system according to an embodiment of the invention.

FIG. 4 illustrates a wheel alignment system 400 according to an embodiment of the invention. The wheel alignment system 400 includes the wheel alignment device 100, a second wheel alignment device 401, a cart 480, and a computer 485. The wheel alignment system 400 is a complete wheel alignment system. The alignment system 400 can perform alignments on two wheels at once. The wheel alignment device 100 in FIG. 4 shows the hub adapter 110, the height slots 115, the wheels 150, the electronic input 160, and the power switch 165. The wheel alignment device 401 includes wheels 450, a first optical sensor 435, and a hub adapter 410, which can be similar to the wheels 150, the first optical sensor 135, and the hub adapter 150 discussed in FIG. 1. The cart 480 rolls and contributes to the mobile nature of the wheel alignment system 400.

The computer 485 has an intuitive interface, automatic alignment surface mapping and compensation, a database of acceptable alignments, suspension cycle analyzing, a set up guide, and a processor for comparing the measured alignment parameters to acceptable alignment parameters. The computer 485 can provide a self-contained specification read-out. In another embodiment, the jig provides a self-contained specification read-out without the computer 485. Then, the computer 485 is not needed, as the jig 105 has a screen with the self-contained read out of an alignment parameter.

Figure 5:
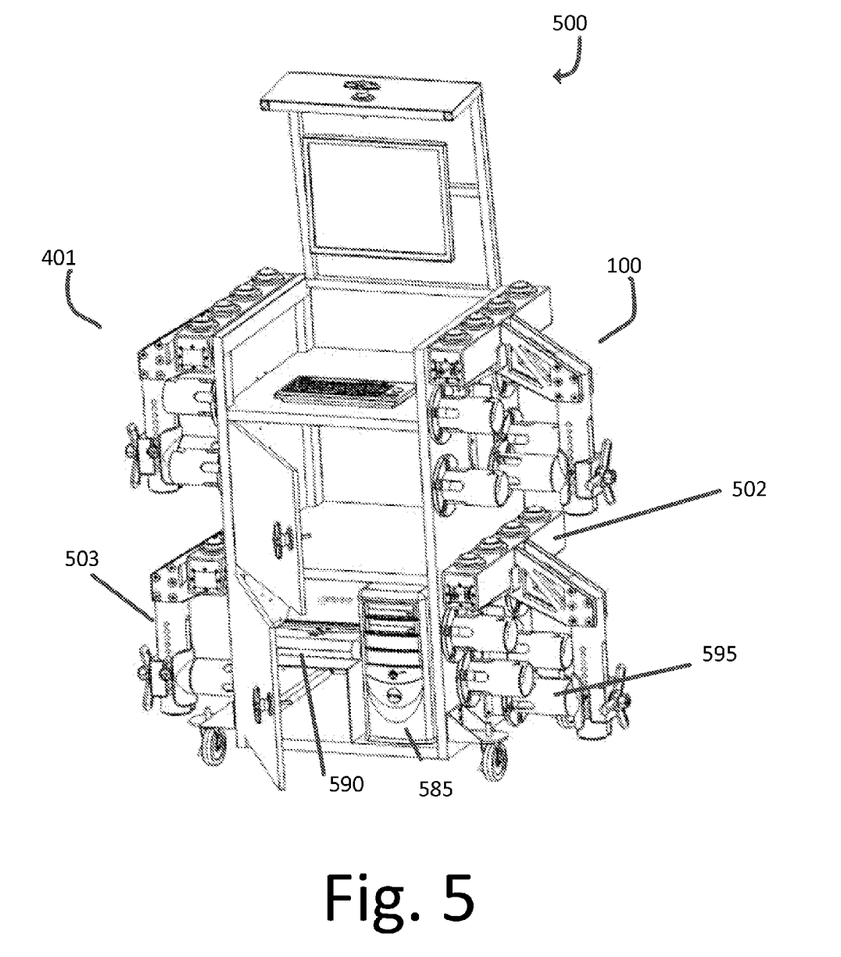
FIG. 5 illustrates a wheel alignment system according to an embodiment of the invention.

FIG. 5 illustrates a wheel alignment system 500 according to an embodiment of the invention. The alignment system 500 can perform both two wheel alignments at once by using two of the four wheel alignment devices, and can perform four wheel alignments at once by using all four of the wheel alignment devices 100, 401, 502, 503. The wheel alignment system 500 includes the wheel alignment device 100, the wheel alignment device 401, a wheel alignment device 502, a wheel alignment device 503, a computer 585, a printer 590, and alternative sized hub adaptors 595. The alternative sized hub adaptors 595 attach to wheel hubs having a varying number or pattern of bolts. The wheel alignment system 500 having two more wheel alignment devices than the wheel alignment system 400, and having more storage space for additional features (e.g., tool trays, keyboard, webcam for live video customer support, battery charging racking hooks, cabinets, etc.).

The wheel alignment devices 502, 503, and computer 585 can be similar to the wheel alignment devices 100, 401, and computer 485 discussed in FIG. 4. The printer 590 (e.g., a network printer) allows the mechanic to print out the alignment results for analysis and customer review. The alternative sized hub adaptors 595 are conveniently located for wheel hub assemblies having a different lug pattern.

Figure 6:
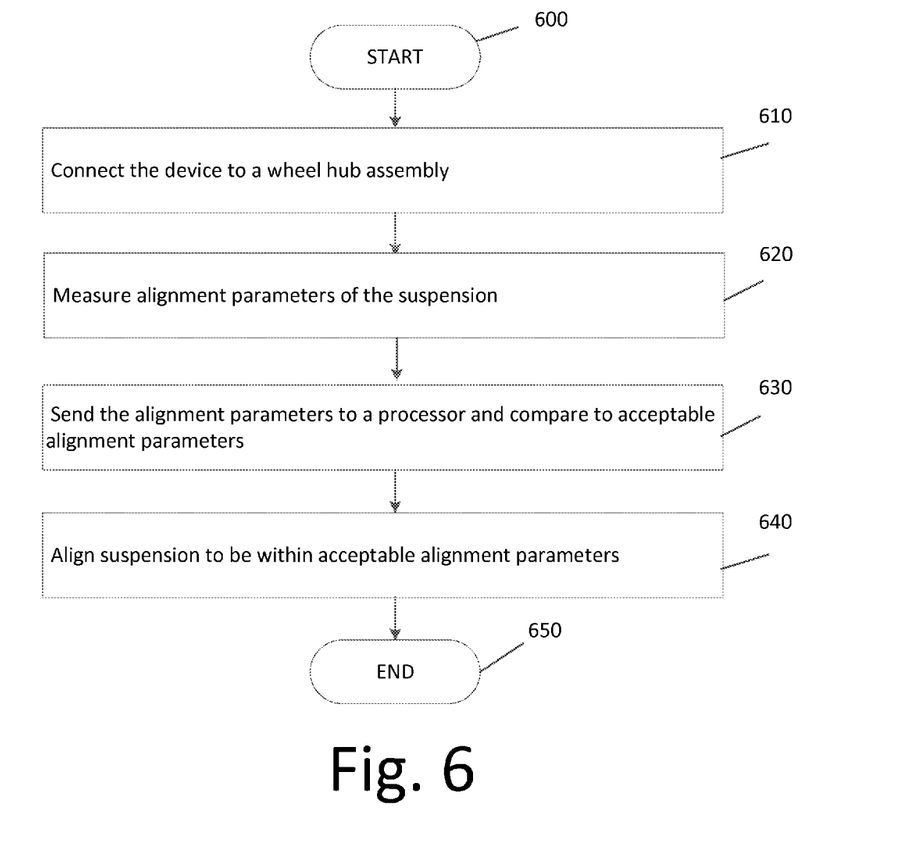
FIG. 6 illustrates a process of aligning a wheel according to an embodiment of the invention.

FIG. 6 illustrates a process of aligning a wheel according to an embodiment of the invention. The process starts at step 600. At step 610, a mechanic connects the wheel alignment device 100 to the bolts of a wheel hub assembly after a floor jack is placed under the vehicle and the vehicle's wheel is removed. The wheels 150 allow the suspension to settle. The mechanic measures the alignment parameters of the suspension using the first optical sensor 135 and the second optical sensor 140 at step 620. Then, at step 630, the circuit board 145 sends the alignment parameters to a processor and compares the alignment parameters to acceptable alignment parameters. Proceeding to step 640, the mechanic aligns the suspension to be within the acceptable alignment parameters. The process ends at step 650.

It is to be recognized that depending on the embodiment, certain acts or events of any of the methods described herein can be performed in a different sequence, may be added, merged, or left out altogether (for example, not all described acts or events are necessary for the practice of the method). Moreover, in certain embodiments, acts or events may be performed concurrently, for example, through multi-threaded processing, interrupt processing, or multiple processors, rather than sequentially.

The steps of a method or algorithm described in connection with the embodiments disclosed herein may be embodied directly in a computer or electronic storage, in hardware, in a software module executed by a processor, or in a combination thereof. A software module may reside in a computer storage such as in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

I claim:

1. A portable wheel alignment device comprising:
a jig having a top and a bottom; and
a plurality of wheels attached to the bottom of the jig, wherein the plurality of wheels are configured to roll independently of each other and roll in all directions to allow free movement in any direction of the jig across a ground surface to allow for settling a suspension of a vehicle, the jig having a hub adaptor configured to attach to bolts of a wheel hub assembly of the vehicle and configured to align the suspension.

2. The device of claim 1, further comprising load cells configured to measure total weight and corner weight of the vehicle.

3. The device of claim 1, wherein the jig comprises height slots and a height adjustment plug or repositionable fasteners.

4. The device of claim 1, wherein the jig comprises an electronics cartridge and a circuit board.

5. The device of claim 1, wherein the jig comprises a plurality of optical sensors.

6. The device of claim 1, wherein the jig comprises a power switch and a battery or an electrical lead for an external power supply.

7. A portable wheel alignment device comprising:
a jig configured to take the place of a removed vehicle wheel for purposes of measuring, analyzing, and adjusting vehicle alignment; and
a plurality of independent rolling wheels attached to the jig, the plurality of independent rolling wheels are arranged to allow movement of the jig across the ground or work surface in any direction during settling a suspension of a vehicle.

8. The device of claim 7, wherein the plurality of independent rolling wheels are in the form of spherical bearings, caster wheels, or rotary bearings.

9. The device of claim 7, further comprising load cells configured to measure total weight and corner weight of a vehicle.

10. The device of claim 7, wherein the jig provides for vertical adjustment of a hub adaptor.

11. The device of claim 7, further comprising one or more laser sensors or laser indicators.

12. The device of claim 7, further comprising one or more optical sensors or optical indicators.

13. The device of claim 7, further comprising a visual indicator configured to indicate a jig measure height.

14. The device of claim 7, further comprising a hub adaptor for radial adjustment of wheel bolt mounting locations.

15. The device of claim 14, wherein the hub adaptor is a universal hub adaptor.

16. The device of claim 7, further comprising a universal hub adaptor which can fit various hub and lug patterns.

17. The device of claim 7, further comprising a tape measure, a bubble level, or a digital measuring device for measuring a vehicle alignment parameter.

18. The device of claim 7, further comprising a multi-axis inclinometer, optical or laser sensor, and processing hardware for compensating or indicating an un-level work surface.

19. The device of claim 7, further comprising a self-contained specification read-out.

20. The device of claim 7, further comprising a wireless communication package.

21. The device of claim 7, further comprising an electronic communications plug.

22. A vehicle wheel alignment method comprising the steps of:
    mounting a jig to a wheel hub assemble of a vehicle, wherein the jig is able to move relative to the vehicle in any direction upon the vehicle settling on a ground surface;
    acquiring vehicle wheel alignment data via the jig; and
    adjusting at least one vehicle wheel alignment parameter based on the acquired vehicle wheel alignment data.

23. The vehicle wheel alignment method of claim 22, wherein the step of mounting comprises:
    raising the vehicle above the ground surface to permit removal of at least one wheel;
    removing a wheel from the vehicle;
    securing the jib to the wheel hub assembly exposed by the remove wheel; and
    lowering the vehicle back to the ground surface, wherein the jig supports a portion of the vehicle's weight.

24. The vehicle wheel alignment method of claim 22, further comprising the step of adjusting the jig's physical geometry based on a particular make and/or model of the vehicle, and/or a particular size of the vehicle's wheel and/or tire.

25. The vehicle wheel alignment method of claim 22, further comprising the steps of:
    mounting a second jig to a second wheel hub assembly by the vehicle, wherein the second jig is able to move relative to the vehicle upon the vehicle settling on a ground surface;
    measuring a vehicle wheel alignment parameter based on a measurement of the jig's position relative to the second jig's position; and
    wherein the acquired vehicle wheel alignment data comprises the measured vehicle wheel alignment parameter.

26. A vehicle wheel alignment method comprising the steps of:
    mounting a jig to a wheel hub assemble of a vehicle, wherein the jig is able to move relative to the vehicle upon the vehicle settling on a ground surface;
    acquiring vehicle wheel alignment data via the jig;
    adjusting at least one vehicle wheel alignment parameter based on the acquired vehicle wheel alignment data;
    acquiring ground surface information via the jig, wherein the ground surface information indicates whether the ground surface is level or not level, and if not level, a degree to which the ground surface deviates from the level; and
    processing the vehicle wheel alignment data to compensate for the degree to which the ground surface deviates from level.

27. A precision hub plate system:
    a jig used in place of a wheel to simulate a loaded tire, the jig configured for vehicle alignment, wherein the jig eliminates tire pressure, weight, and size variations, wherein the jig provides access for suspension adjustments; and
    a plurality of wheels configured to roll independently of each other and roll in all directions to allow the suspension to settle without binding.

\* \* \* \* \*